Nov. 15, 1960     G. H. LELAND ET AL     2,959,969
ROTARY STEPPING MOTOR
Filed April 7, 1958
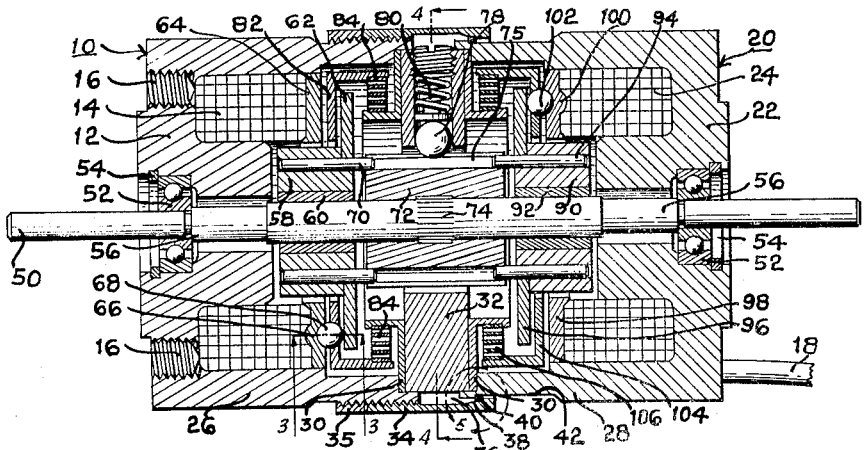
FIG. 1
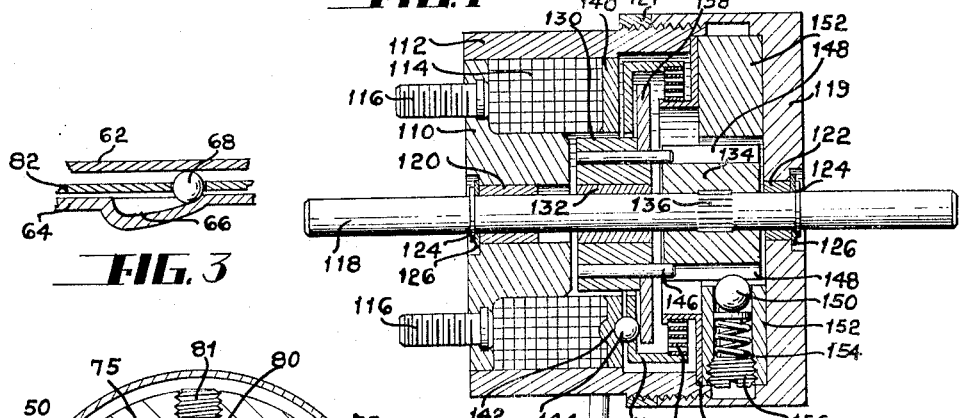
FIG. 2
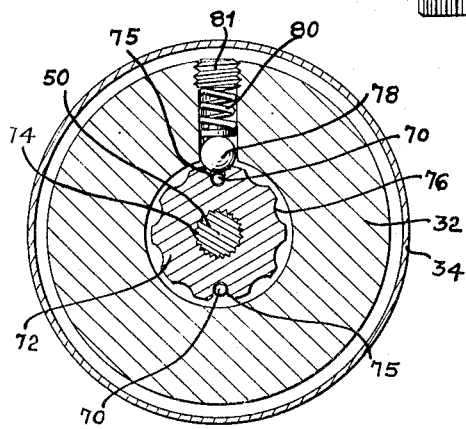
FIG. 3
FIG. 4
FIG. 5
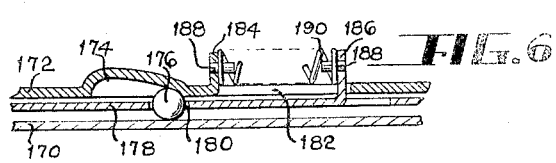
FIG. 6
INVENTOR.
GERALD H. LELAND
ROGER W. BISER
BY
THEIR ATTORNEYS

United States Patent Office 2,959,969
Patented Nov. 15, 1960

2,959,969

ROTARY STEPPING MOTOR

Gerald H. Leland, Dayton, and Roger W. Biser, Troy, Ohio, assignors to Ledex, Inc., a corporation of Ohio Filed Apr. 7, 1958, Ser. No. 726,943

14 Claims. (Cl. 74—88)

This invention relates to a rotary stepping motor and more particularly to improvements in the mechanism for converting linear motion to rotary motion in a rotary solenoid.

One object of this invention is to provide a high speed rotary solenoid or stepping motor of the type utilizing antifriction elements operating against inclined races for converting axial motion to rotary motion.

Another object of this invention is the provision of an improved rotary solenoid unit including two oppositely oriented rotary solenoids assembled within a unified housing for rotating a shaft selectively in opposite directions.

Still another object of this invention is the provision of a high speed positive action rotary solenoid adapted to rotate a shaft in a stepwise manner, which, when de-energized, does not restrict rotation of the driven shaft.

Other objects and advantages reside in the construction of parts, the combination thereof, the method of manufacture and the mode of operation, as will become more apparent from the following description.

In the drawing,

Figure 1 is a sectional view illustrating a dual rotary solenoid unit embodying the improvements which comprise the subject matter of the present invention.

Figure 2 is a sectional view of a single rotary solenoid unit embodying the improvements which comprise the subject matter of this invention.

Figure 3 is a greatly enlarged sectional view taken substantially on the line 3—3 of Figure 1.

Figure 4 is a sectional view taken substantially along the line 4—4 of Figure 1.

Figure 5 is an enlargement of the area bounded by the line 5—5 of Figure 1.

Figure 6 is a sectional view analogous to that of Figure 3 illustrating a modification.

Referring to the drawings in detail, there is illustrated to the left of Figure 1 an electromagnet 10 comprising a core element 12 and a solenoid coil 14. The core element 12 is provided with internally threaded borings 16 for mounting purposes.

To the right of Figure 1 there is illustrated a similar electromagnet 20 comprising a core element 22 and a solenoid coil 24. The solenoid coils 14 and 24 are separately energizable through leads gathered in a cable 18.

The core element 12 of the electromagnet 10 includes a cylindrical wall portion 26 surrounding the solenoid coil 14. Similarly, the core element 22 of the electromagnet 20 includes a cylindrical wall portion 28 surrunding the solenoid coil 24. The two cylindrical wall portions 26 and 28 of the core elements 12 and 22 are joined by means of a coupler 34, the coupler 34 drawing these wall portions one toward the other so as to press against an assembly formed by annular elements 30 and 32 between the electromagnets 10 and 20. These elements 30 and 32 will be described in greater detail subsequently.

The coupler 34 is rotatably secured to the electromagnet 20 by means best illustrated in Figure 5. The coupler 34 is internally grooved to provide an annular recess 36, a beveled portion 38, and an annular flat 39. The grooved portion establishes a shoulder 41 adjacent one margin of the coupler 34. The cylindrical wall portion 28 of the electromagnet 20 is provided with a complementary annular recess 42 establishing a shoulder 43 thereon.

The coupler is attached as follows: The coupler 34 is projected partially over the cylindrical wall portion 28 of the electromagnet 20. A snap ring 40 is first inserted in the recess 36 of the coupler 34, then worked over the shoulder 43 on the wall portion 28 until it snaps into position in the recess 42 behind the shoulder 43. With the snap ring 40 in this position, it is trapped within the recess 42 and can be removed only with difficulty. The snap ring 34 is thus secured against unintentional removal.

With the coupler 34 thus secured to the electromagnet 20, the electromagnets 10 and 20 are drawn together by threadedly engaging the coupler 34 with the cylindrical wall portion 26 of the electromagnet 10. A threaded annular ring 35 engaging the wall portion 26 of the electromagnet 10 is used to lock the coupler 34 in threaded engagement with the electromagnet 10.

A shaft 50 traverses the joined electromagnets 10 and 20 axially. This shaft is journalled for rotation by ring bearings 52, there being one bearing locked into each of the core elements 12 and 22 by means of a snap ring 54. The shaft 50 is secured against axial movement relative to the electromagnet assembly by enlarged shoulders 56 which butt against the inner races of the ring bearings 52.

Adjacent the electromagnet 10 an armature 58 is mounted for axial movement on the shaft 50. A sleeve bearing 60 secured within the armature 58 separates the armature from the shaft 50. Fixedly secured to the armature 58 is an annular armature plate 62, this plate being disposed in a plane normal to the axis of the shaft 50. An annular plate 64 is press-fitted within the cylindrical wall portion 26 of the electromagnet 10 in parallel relation to the armature plate 62.

As best illustrated in Figure 3, the annular plate 64 is provided with inclined arcuate recesses 66. These recesses provide inclined arcuate ball races in the plate 64, their opposite ends being proximal and distal respectively relative to the opposing armature plate 62. Three recesses spaced 120° apart in the plane of the plate 64 concentric with the axis of the shaft 50 are employed. A roller or ball element 68 is provided in each recess 66.

An annular cup-shaped member 82 cages the roller elements 68 between the armature plate 62 and the corresponding annular plate 64. As clearly illustrated in the drawings, the cup-shaped member 82 has apertures in the base thereof and the roller elements, when seated in these apertures, are free to engage the opposing surfaces of both plates 62 and 64. A spiral spring 84, coacting between the caging member 82 and the annular element 30, functions through rotation of the caging member 82, to drive the roller elements 68 to the shallow or proximal ends of the inclined recesses 66 in the annular plate 64. As previously described, the annular element 32 and the annular elements 30, there being one element 30 on each side of the element 32, are compressed between the electromagnets 20 and 30 through action of the coupler 34 and are thereby nonrotatably secured within the rotary solenoid assembly.

This bias applied by the spring 84 to the roller elements 68 tends to wedge the armature plate 62 away from the annular plate 64. Movement of the plate 62 away from the plate 64 is limited by the element 30, the arrangement being such that at maximum separation of the plates 62 and 64 the roller elements 68 are not free to move out of the recesses 66. The condition of maximum separation of the plates 62 and 64 is illustrated in Figure 3.

The following assembly is used to connect the armature 58 nonrotatably to the shaft 50. A cylindrical member 72 is press-fitted upon the shaft 50 and secured against rotation thereon by means of knurls 74. Diametrically opposed channels 75 formed in the member 72 slidably receive pins 70 secured in diametrically opposed positions to the armature 58. The arrangement is such that the armature 58 is nonrotatably secured to the member 72 but is free to move axially relative to the member 72.

As best illustrated in Figure 4, the member 72 is provided with a plurality of peripheral notches 76 adapted to engage a ball detent 78 carried by the annular element 32. The ball detent 78 is biased radially into the notches 76 by a spring element 80 secured by a set screw 81. The arrangement is such that the ball detent 78 will locate the shaft 50 at discrete angular orientations.

From the foregoing description, it is apparent that electrical energization of the solenoid coil 14 associated with the electromagnet 10 will cause an attraction between the core element 12 and the armature 58 thereby drawing the annular plate 62 toward the corresponding annular plate 64. The annular plate 62 can approach the corresponding plate 64 only if the roller elements 68 are permitted to roll into their recesses 66 toward the ends thereof which are distal relative to the armature plate 62. This requires that the magnetic attraction between the core 12 and the armature 58 exceeds the bias applied by the spiral spring 84.

Friction between the roller elements 68 and the base of their recesses 66 will cause the roller elements to rotate as they roll into their recesses 66. Friction between the roller elements 68 and the annular plate 62 will, in turn, cause the annular plate 62 to rotate. Rotation of the annular plate 62 will be transmitted to the member 72 and the shaft 50 by means of the pins 70.

The length of the recesses 66 is correlated to the central angle between adjacent notches 76 in the member 72, such that movement of the roller elements 68 along the length of the recesses 66 will be just sufficient to rotate the member 72 through an angle corresponding to the central angle between notches 76.

With the member 72 rotated through one notch in its periphery, the roller elements 68 are at maximum penetration in the annular plate 64 and, correspondingly, the armature 58 is at its closest approach to the core element 12 of the electromagnet 10. Movement of the roller elements 68 in the recesses 66 has tensioned the spring 84. The instant the core element 14 is deenergized, the spring 84 actuates the casing member 82 so as to roll the roller elements 68 to the shallow or proximal ends of their recesses 66, driving the armature plate 62 axially away from the annular plate 64, thereby separating the armature 58 from the core element 12.

With the electromagnet 10 deenergized, there is no attraction between the annular plates 62 and 64 and it follows that there is only slight friction between the roller elements 68 and the plate 62. Accordingly, no appreciable torque is transmitted to the annular plate 62 as the roller elements 68 are rolled to the shallow ends of their respective recesses 66. The spring 84 is therefore capable of resetting the rotary conversion mechanism, comprising the roller elements 68 and the annular plates 62 and 64, so that upon subsequent energization of the coil element 14, the shaft 50 may be rotated through another increment in the same direction. In this respect, the described assembly provides a rotary stepping device as opposed to reciprocating rotary devices.

The rotary conversion assembly associated with the electromagnet 10 is duplicated in association with electromagnet 20. Thus, adjacent core 22 of the electromagnet 20 is an armature 90 journalled on the shaft 50 with a sleeve bearing 92. The armature 90 is connected slidably to the member 72 by pins 94 engaging the channels 75 of the member 72. An annular plate 96 attached to the armature is arranged in spaced parallel relation to a complementary annular plate 98 press-fitted in the cylindrical wall portion 28 of the core element 22 associated with the electromagnet 20. The annular plate 98 is provided with arcuate recesses 100 analogous to the recesses 66 in the annular plate 64 associated with the electromagnet 10. Roller elements 102 are seated in the recesses between the plates 96 and 98 and are caged by a cup-shaped caging member 104. A spiral spring 106 connects the caging member 104 to an annular element 30 sandwiched between the cylindrical wall portions 26 and 28 of the electromagnets 10 and 20, respectively.

The rotary conversion mechanisms associated with the electromagnets 10 and 20 are designed to function oppositely. That is, when the electromagnet 10 is energized, the shaft 50 is rotated one increment in one direction whereas, when the electromagnet 20 is energized, the shaft 50 is rotated one increment in the opposite direction. It is to be noted, of course, that when neither electromagnet 10 nor 20 is energized, the shaft 50 may be rotated manually provided sufficient force is applied to overcome the resistance supplied by the detent 78 biased by spring 80.

Figure 2 illustrates a unidirectional rotary solenoid embodying the rotary conversion mechanism of this invention. This unidirectional rotary solenoid comprises a core element 110 press-fitted within a cylindrical housing member or portion 112 and forming the base thereof. A solenoid coil 114 encircles a portion of the core element 110 and cooperates therewith to form an electromagnet. The electromagnet is energized through a cable 115. Threaded studs 116 secured to the core element 110 provide a means for mounting the rotary solenoid.

A cup-shaped cover member 119 threadedly engages the cylindrical housing portion 112 on the end thereof opposite the core element 110. The cover member 119 is locked in place by means of a threaded annular ring 121.

A shaft 118 passes axially through the core element 110 and the cover member 119. Bearings 120 and 122 support the shaft 118 for rotation in the core element 110 and the cover member 119, respectively. The shaft 118 is restrained from axial movement relative to the rotary solenoid housing by means of snap rings 124 seated in suitable annular grooves in the shaft 118 and butted against washers 126 recessed in the external surfaces of the core element 110 and the cover member 119 respectively.

An armature 130 mounted in a sleeve bearing 132 is journalled for axial motion on the shaft 118 within the housing for the rotary solenoid. Adjacent the armature 130, a cylindrical member 134 is press-fitted on the shaft 118 and secured nonrotatably thereto by means of suitable knurls illustrated at 136. The armature 130 is nonrotatably connected to the member 134 by means of pins 146 anchored in diametrically opposed positions in the armature 130 and projecting into channels 148 located in diametrically opposed positions in the periphery of member 134.

Notches in member 134 analogous to the notches 76 provided in the member 72 of the embodiment of Figure 1 are engaged by a ball detent 150 biased into the notches by means of a spring 154 housed in an annular member 152. The spring 154 is contained by a set screw 156. The annular member 152 together with an annular element 162, to be described in greater detail subsequently, is secured against rotation in the housing through compression of the cover member 119 against the cylindrical housing portion 112.

Fixedly secured to the armature 130 is an annular plate 138. Press-fitted within the cylindrical housing portion 112 is an annular plate 140 arranged in spaced parallel relation to the plate 138. The plate 140 is provided with three arcuate inclined recesses 142 analogous to those illustrated at 66 in Figure 3. Roller elements 144 seated in these recesses 142 are caged by a cup-shaped caging member 158 which is biased in an extreme rotary position by a spiral spring 160 anchored to the element 162. In addition to anchoring the spring 160, the element 162 serves to limit axial movement of the armature 130.

It will be apparent that the embodiment of Figure 2 operates as follows. Upon energization of the solenoid coil 114 the armature 130 will be drawn toward the core element 110, driving the roller elements 144 into the recesses 142 in the annular plate 140. Frictional engagement between the roller elements 144 and the bases of the recesses 142 imparts rotation to the roller elements 144 which is transmitted frictionally to the plate 138 secured to the armature 130. In turn, the armature 130, member 134, and the shaft 118 are rotated. The rotation of the shaft 118 is confined to discrete increments by means of the member 134 coacting with the ball detent 150.

Figure 6 illustrates a modified assembly for converting axial movement of an armature to a rotary movement. This assembly comprises a pair of parallel circular plates 170 and 172 which, as will be described in the following, are to be mounted for relative rotation about a central axis. The plate 172 is provided with inclined arcuate recesses illustrated at 174, there being three recesses 174 distributed concentrically on the plate. A ball element 176 is seated in each recess 174.

The ball elements 176 are caged by a circular caging member 178 provided with apertures 180 receiving the roller elements 176. The assembly including the plates 170 and 172, the recesses 174, the roller elements 176 and the caging member 180 as thus far described is substantially identical with the rotary conversion assembly of Figure 3 which includes parallel plates 62 and 64, recesses 66, roller elements 68 and a caging member 82.

The plate 172 of the modified rotary conversion assembly is provided with an elongate arcuate slot 182 adjacent each recess 174 therein. In forming these slots, portions are struck from the plate 172 and a part of each struck portion is retained to form an upstanding lug 184 adjacent each recess 174 in the plate 172. In a similar operation, upstanding lugs 186 are struck from the caging member 178. The assembly is such that the lugs 186 project through the slots 182 of the plate 172 in spaced relation to the lugs 184 thereof. The lugs 184 and 186 are each provided with a short shaft 188, these shafts cooperating to retain a compression spring 190 between the pairs of lugs 184 and 186.

The compression springs 190 bias the caging member 178 relative to the plate 172 driving the roller elements 176 to the shallow ends of the recesses 174. Clearly, any force applied to the plates 170 and 172 tending to draw these plates together will drive the roller elements 176 to the deep ends of their respective recesses, imparting relative rotation to the plates 170 and 172 and simultaneously compressing the springs 190. Upon release of such force the compression springs 190 will operate to reset the roller elements 176 in the shallow ends of their recesses 174. The compression springs 190 are thus the equivalent of the spiral reset springs employed in the previously described embodiment. While three springs 190 have been described in the embodiment of Figure 6, their action is cumulative and a single spring would be sufficient for some applications. It will be apparent to one skilled in the art that if the positions of the lugs 184 and 186 were reversed, an extension spring rather than the compression spring 190 would be required.

The rotary conversion mechanism of Figure 6 is to be used in association with an electromagnet and an armature distributed upon a shaft in the manner illustrated in the embodiments of Figures 1 and 2. Either of the plates 170 or 172 may be fixedly attached to the armature whereupon the other of the plates is to be mounted fixedly with respect to the electromagnet. For example, the plates 170 and 172 may be substituted directly for the plates 140 and 138, respectively, of the embodiment of Figure 2, while simultaneously, the caging member 178 and the spring 190 may be substituted for the caging member 158 and spring 160 of the same embodiment. Such a substitution would in no way alter the operation of the rotary solenoid device as illustrated in Figure 2.

In the foregoing, three embodiments of rotary solenoids or stepping motors utilizing a rotary conversion mechanism including a pair of spaced parallel plates, inclined races in one of the plates opposing flat surfaces in the other of the plates, and ball elements therebetween are described. While these specific stepping motor designs are preferred for their neatness, compactness, and economy, it is to be understood that the present invention is not limited to such specific designs.

Although the preferred embodiments of the device have been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described our invention, we claim:

1. In a rotary stepping device comprising an electromagnet, an armature and a shaft, said electromagnet and said armature being distributed on said shaft for axial movement one relative to the other, a first plate secured against rotary movement relative to said electromagnet, a second plate rotatable relative to said electromagnet, said first and second plates being disposed on said shaft in parallel opposing relation for actuation one toward the other by said armature, one of said plates having a surface encircling the axis of said shaft and occupying a plane normal thereto, the other of said plates having an arcuate inclined surface opposing the first named surface, a roller element disposed between said surfaces and in contact therewith, yielding means urging said roller element along said inclined surfaces to separate said plates, means limiting the separation of said plates, the construction and arrangement being such that upon energization of said electromagnet said plates will be driven one toward the other by said armature producing relative rotation therebetween, and means for transmitting the rotation of said second plate to said shaft.

2. The rotary stepping device according to claim 1 wherein the yielding means comprises a caging element disposed between said plates, said caging element having an aperture therein receiving said roller element whereby said roller element is caged between said plates, and spring means biasing said caging element rotatably relative to said one plate to urge said roller element along the inclined surface thereof to separate said plates.

3. The rotary stepping device according to claim 1 including detent means for regulating the rotary motion imparted to said shaft, said detent means including a cylindrical member mounted fixedly and concentrically upon said shaft, said cylindrical member having a notched periphery, and a detent releasably engaging the notched periphery of said cylindrical member, the means for transmitting the rotation between said armature and said electromagnet to said shaft including means connecting said armature nonrotatably to said cylindrical member.

4. The rotary stepping device according to claim 1 wherein the yielding means comprises a caging element disposed between said plates, said caging element having an aperture therein receiving said roller element, said one plate having an arcuate slot therein and a first lug thereon, a second lug projecting from said caging member through said slot in spaced relation to said first lug, said arcuate slot being arranged to permit movement of said second lug relative to said first lug in accordance with the relative rotation between said armature and said electromagnet, and spring means operating between said lugs biasing said caging element rotatably relative to said one plate to urge said roller element along the inclined surface thereof to separate said plates.

5. A rotary stepping device including, in combination, a cylindrical housing, a shaft passing axially through said housing and journalled for rotation therein, a core element fixedly attached to one end of said housing and encircling said shaft, a solenoid coil encircling said core element and cooperating therewith to form an electromagnet, an armature journalled for axial movement on said shaft in spaced relation to said core element, a first annular plate fixedly secured to said armature, a second annular plate fixedly mounted between said electromagnet and said first plate, a plurality of arcuate inclined recesses disposed concentric with respect to said shaft in the face of said second plate, said first plate having a planar face opposing said inclined recesses, a plurality of ball elements disposed between said plates and in contact with the opposing faces thereof, there being one ball element situated in each of said recesses, a caging member caging said ball elements between said plates, spring means biasing said caging member rotatably relative to said second plate to urge said ball elements to an extreme rotary position in said inclined recesses so as to separate said first and second plates, the construction and arrangement being such that upon energization of said electromagnet said first plate is drawn by said armature toward said second plate with consequent rotation of said first plate, and means for transmitting the rotation of said first plate to said shaft.

6. The rotary stepping device according to claim 5 wherein the means for transmitting rotation of said first plate to said shaft comprises a cylindrical member fixedly secured to said shaft, said cylindrical member having an axially extending channel therein, a pin anchored in said armature slidably engaging the channel of said cylindrical member whereby said armature is nonrotatably secured to said cylindrical member but is free to move axially relative to said cylindrical member, said cylindrical member having a plurality of notches in the periphery thereof, and detent means yieldingly engaging said notches, said detent means cooperating with said cylindrical member to confine the rotation of said shaft between fixed increments.

7. In a bi-directional stepping device for imparting rotary movement in an output shaft, said device including a pair of electromagnets secured in spaced relation with said shaft extending therebetween, a pair of armatures journalled on said shaft, there being one armature associated with each electromagnet, and a pair of rotary conversion units, there being one unit positioned adjacent each electromagnet for actuation by the associated armature, said conversion units being effective upon actuation by said armatures to selectively rotate said shaft in opposite directions, the improvement therein wherein said conversion units each comprise a pair of members having opposing surfaces, means securing one member against rotation relative to the adjacent electromagnet, means connecting the other member to said shaft for rotation therewith, said members being positioned for actuation one toward the other by the associated armature, one of said opposing surfaces occupying a plane normal to the axis of said shaft, the other surface being inclined to said one surface along an arcuate path concentric to said shaft, a roller element disposed between said surfaces and in contact therewith, and yielding means biasing said roller element with respect to said inclined surface to separate said members.

8. A rotary stepping device including an electromagnet, an armature and a shaft, said electromagnet and said armature being distributed on said shaft for axial movement one relative to the other, means secured against rotation with respect to said electromagnet encircling said shaft providing an axially inclined surface concentric with respect to said shaft, a roller element engaging said surface, first means responsive to axial movement of said armature toward said electromagnet for pressing said roller element against said axially inclined surface whereby said roller element is constrained to roll on said surface, second means separate from said first means engaging said roller element and responsive to rolling movement thereof for rotating said shaft, and yielding means opposing the rolling movement of said roller element.

9. The rotary stepping device according to claim 8 wherein the yielding means opposing the rolling movement of said roller element comprises a caging element confining said roller element, and spring means biasing said caging element opposing rotary movement of said roller element when pressed against said inclined surface.

10. A rotary actuating mechanism including, in combination, a plate, a roller element disposed in rolling engagement with one surface of said plate, a member caging said roller element, said caging member having an aperture therein through which the roller element projects, means supporting said caging member for rotation relative to said plate such that said roller element may roll on the surface of said plate along an arcuate path concentric to the axis of relative rotation, the surface of said plate engaged by said roller element being inclined helically with respect to the axis of relative rotation, and yielding means biasing said caging member relative to said plate to urge said roller element to an extreme position on said helically inclined surface.

11. In a rotary actuating device, a pair of members having opposing surfaces, an antifriction element interposed between said opposing surfaces and coacting therewith to separate said members, means supporting said members in adjacent relation for axial and rotary movement one relative to the other, one of said opposing surfaces encircling the axis of relative rotary movement and occupying a plane normal thereto, the other of said surfaces being inclined relative to said one surface along an arcuate path concentric to the axis of relative rotation, said inclined surface extending between extremes which are proximal and distal respectively relative to the opposing surface, and means biasing said antifriction element to the proximal extreme of said inclined surface.

12. In a rotary actuating device a pair of members having opposing surfaces, an antifriction element interposed between said opposing surfaces and coacting therewith to separate said members, means supporting said members in adjacent relation for axial and rotary movement one relative to the other, one of said opposing surfaces encircling the axis of relative rotary movement and occupying a plane normal thereto, the other of said surfaces being inclined relative to said one surface along an arcuate path concentric to the axis of relative rotation, said inclined surface extending between extremes which are proximal and distal respectively relative to the opposing surface, means caging said antifriction element between said surfaces, and yielding means biasing said caging means to urge said antifriction element to the proximal extreme of said inclined surface.

13. In a rotary actuating device a pair of members having opposing surfaces, an antifriction element interposed between said opposing surfaces and coacting therewith to separate said members, means supporting said members in adjacent relation for axial and rotary movement one relative to the other, one of said opposing surfaces encircling the axis of relative rotary movement and occupying a plane normal thereto, the other of said surfaces being inclined relative to said one surface along an arcuate path concentric to the axis of relative rotation, said inclined surface extending between extremes which are proximal and distal respectively relative to the opposing surface, means caging said antifriction element between said surfaces, and yielding means coacting between said caging means and the member having the inclined surface to bias the antifriction element to the proximal extreme of said inclined surface.

14. An actuating device for inducing movement of a driven member upon relative linear motion between the actuating device and the driven member, said driven member having a planar surface opposite said actuator occupying a plane normal to the axis of relative linear motion, the induced movement being along a path parallel to said planar surface, said actuating device comprising a first member opposite said planar surface having a surface inclined relative thereto, a roller element interposed between said relatively inclined surfaces in rolling contact therewith, a cage member for said roller element, and means biasing said cage member relative to said first member to urge said roller element along said inclined surface in the direction of said driven member.

References Cited in the file of this patent
UNITED STATES PATENTS

| | | |
|---|---|---|
| 2,417,788 | Soffel | Mar. 18, 1947 |
| 2,566,571 | Leland | Sept. 4, 1951 |
| 2,828,636 | Hall | Apr. 1, 1958 |
| 2,887,889 | Parisoe | May 26, 1959 |

FOREIGN PATENTS

| | | |
|---|---|---|
| 532,880 | Great Britain | July 20, 1940 |